P. A. WAGNER.
METHOD OF MAKING REEDS FOR LOOMS.
APPLICATION FILED MAR. 5, 1913. RENEWED MAR. 4, 1914.
1,112,742. Patented Oct. 6, 1914.
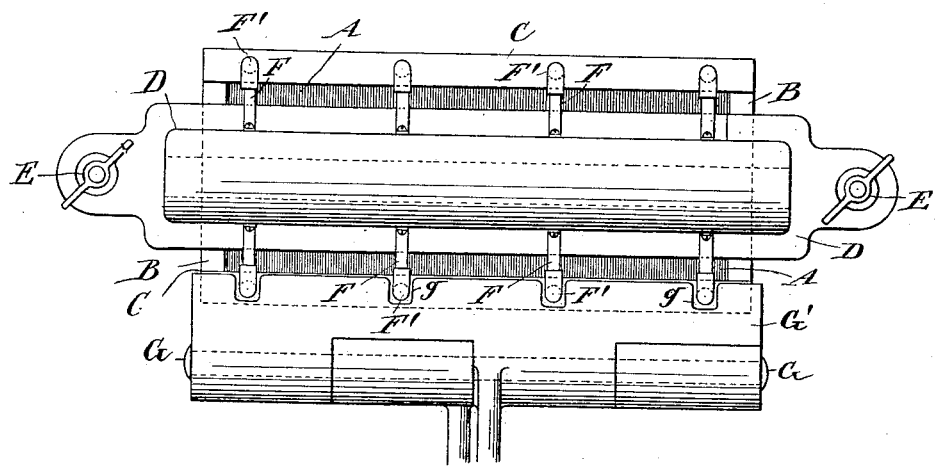
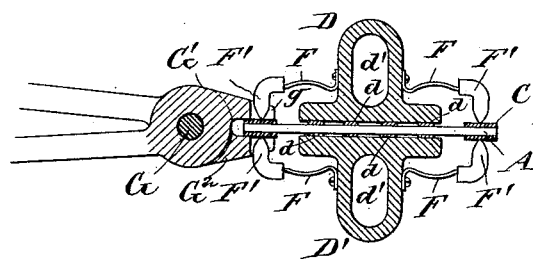
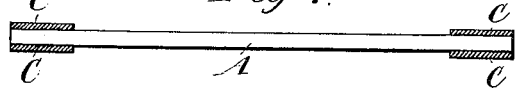
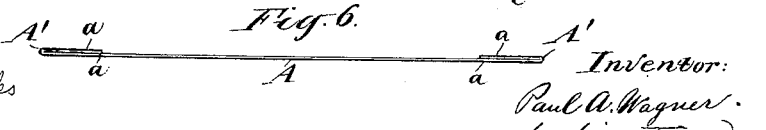

UNITED STATES PATENT OFFICE.

PAUL A. WAGNER, OF CARLSTADT, NEW JERSEY.

METHOD OF MAKING REEDS FOR LOOMS.

1,112,742.

Specification of Letters Patent.

Patented Oct. 6, 1914.

Application filed March 5, 1913, Serial No. 752,040. Renewed March 4, 1914. Serial No. 822,480.

*To all whom it may concern:*

Be it known that I, PAUL A. WAGNER, a citizen of the United States, residing at Carlstadt, in the county of Bergen and State of New Jersey, have invented certain new and useful Improvements in Methods of Making Reeds for Looms, of which the following is a specification.

The manufacture of soldered reeds as now generally practised is an extremely laborious and expensive process. The dents are connected by several runs of helical wire or "springs" extending longitudinally of the reed, two of such springs serving subsequently in separating the dents; the latter with the bands are wired together at frequent intervals along the margins, and the portions of the dents, end-posts, bands, and springs forming such margins are dipped in acid or soldering fluid and again in the melted solder. It is necessary to fill the spaces between the dents with lime to prevent the solder from flowing into and filling such spaces, and the subsequent work required to remove the lime and surplus acid and in repairing damage to dents due to the removal of some of the springs, is very considerable, and the resulting reed is far from the perfection desired.

The object of this invention is to provide a method of manufacture by which a reed of a high degree of perfection may be produced with but little labor and expense.

The invention consists in certain novel steps or successive operations in the treatment, to be hereinafter set forth, by which the above objects are attained.

The accompanying drawings form a part of this specification and show certain features of construction, and apparatus by which the method may be easily and successfully carried out.

Figure 1 is a plan view of a reed partially completed, held in a clamp and gripped at one side by the soldering tool. Fig. 2 is a corresponding transverse section. Fig. 3 is a view of a portion of one end of a finished reed with one band removed and in horizontal section. Fig. 4 is a corresponding section taken between two adjacent dents. Fig. 5 is a similar view showing the parts before the bands are applied and soldered. Fig. 6 is an edge view of one of the dents.
Similar letters of reference indicate the same parts in all the figures.

A A are the dents which may be spaced in any desired manner and shown as spaced by folding the ends of each upon itself as at $A^1$ to provide the required opening between adjacent dents.

B B are the end posts, of the same thickness and length as the folded dents, and C C are the bands forming the longitudinal margins of the reed.

In carrying out the method completely the dents are preferably tinned, or coated with copper, at the ends as indicated at $a\ a$ in Fig. 6, and may be thus covered throughout the entire length if desired, to insure against rust or corrosion. The bands are each provided with a thin layer $c$ of solder upon the face to be joined to the dents and end-posts, which layer may be a coating applied to such face, or may be a thin strip or strips separate from the band.

The dents are arranged side by side upon a bar $D^1$ having longitudinally extending strips $d\ d$ of rubber on its upper face and serving with a similar upper bar D as a clamp by which the dents and end-posts are grasped and firmly engaged by tightening the thumb-screws E at each end of the clamp as will be understood, the edges of the dents being partially embedded in the rubber strips $d$ by such pressure and thus reliably held in proper relation to each other. The side faces of the bars D and $D^1$ carry flat springs F extending laterally in opposite directions and each equipped with a tip $F^1$ of porcelain, glass or other material not affected by moderately high temperatures, and serving as spring fingers for yieldingly holding the bands in position.

The solder-coated faces of the bands, or, if independent strips of solder are to be used, both faces of such strips, are supplied with a small quantity of suitable flux or with acid or any preferred soldering fluid and applied upon the exposed side portions of the dents at the ends of the latter, carefully located flush with the edge thereof and held in the desired position by the tips $F^1$ of the spring fingers which bear with sufficient force thereon to support and hold them. A heated soldering-tool composed of jaws $G^1\ G^2$ pivotally mounted on a hinge-pin G, each jaw having notches $g$ spaced to match to the tips $F^1$, is then applied to the bands along one edge of the reed and compressed momentarily on both bands until the latter are heated sufficiently to melt the solder. The other edge is then similarly treated and the operation is completed.

An essential factor of success is the capability of supplying a predetermined quantity of solder and avoiding any surplus; the thickness of the coating or layer of solder is nicely calculated to insure a sufficient amount when melted to fill the minute interstices between the folds $A^1$ and the adjacent surfaces of the dents and bands but not in sufficient excess as to flow beyond the confines of the bands, and the quantity of soldering fluid supplied is so slight as to moisten only the ends of the dents and band surface leaving no surplus to be drawn by capillary attraction into the open spaces between the dents in the open portion of the reed and thus induce a corresponding following flow of the solder. By carefully predetermining the quantity of solder and its uniform distribution, and quantity of soldering fluid supplied, the joining is rigidly effected and the bands and ends of the dents formed into practically a single whole along each margin of the reed without encroachment upon the open working portion. No subsequent cleaning or polishing is required, the spaces are clear and free throughout the whole length of the dents between one marginal band and the other, and by reason of the firm but yielding grasp afforded by the soft strips $d$ $d$ the dents are reliably located and maintain their uniformity of spacing during the soldering operation.

The bars $D$ $D^1$ are preferably of metal and provided with an opening $d^1$ through which air or a cooling liquid may be circulated to keep the main portions of the dents at a low temperature during the soldering operation.

The holding and soldering apparatus shown are not essential and any suitable means for holding the parts in the assembled condition may be substituted. The soldering tool may be modified, or the required heat supplied in any preferred manner.

Instead of the rubber strips $d$ described, strips of felt or other material capable of yieldingly receiving the edges of the dents may be employed.

I claim:—

The method of making reeds which consists in assembling the dents in substantially parallel spaced relation, interposing a thin layer of solder between the side edges of their ends and the marginal bands, fluxing the bands and dents, applying heat at the terminal portions of the dents and applying yielding pressure to the bands to press the molten solder into the interstices between the dents and bands to fill the same and on cooling secure the parts in fixed position.

In testimony that I claim the invention above set forth I affix my signature, in presence of two witnesses

PAUL A. WAGNER.

Witnesses:
HERMAN FOTH,
CHARLES R. SEARLE.